(12) United States Patent
Duong

(10) Patent No.: US 8,631,878 B2
(45) Date of Patent: Jan. 21, 2014

(54) WELLHEAD ANNULUS SEAL ASSEMBLY AND METHOD OF USING SAME

(75) Inventor: Khanh A. Duong, Sugar Land, TX (US)

(73) Assignee: Vetco Gray Inc., Houston, TX (US)

( * ) Notice: Subject to any disclaimer, the term of this patent is extended or adjusted under 35 U.S.C. 154(b) by 314 days.

(21) Appl. No.: 12/691,327

(22) Filed: Jan. 21, 2010

(65) Prior Publication Data

US 2011/0174506 A1    Jul. 21, 2011

(51) Int. Cl.
*E21B 33/12* (2006.01)

(52) U.S. Cl.
USPC ........... 166/387; 166/180; 166/196; 277/327; 277/522

(58) Field of Classification Search
USPC .................. 277/329, 328, 508, 609, 327, 522; 166/387, 180, 208, 196
See application file for complete search history.

(56) References Cited

U.S. PATENT DOCUMENTS

| | | | | |
|---|---|---|---|---|
| 1,872,665 A | * | 8/1932 | Brownell | 285/121.7 |
| 2,628,112 A | * | 2/1953 | Hebard | 277/506 |
| 3,284,086 A | * | 11/1966 | Primrose et al. | 277/308 |
| 4,291,768 A | * | 9/1981 | Diehl | 166/378 |
| 4,521,040 A | * | 6/1985 | Slyker et al. | 285/123.12 |
| 4,702,481 A | * | 10/1987 | Brammer | 277/328 |
| 4,714,111 A | | 12/1987 | Brammer | |
| 4,751,965 A | | 6/1988 | Cassity | |
| 4,949,787 A | | 8/1990 | Brammer et al. | |
| 5,230,498 A | * | 7/1993 | Wood et al. | 251/214 |
| 5,749,585 A | * | 5/1998 | Lembcke | 166/217 |
| 5,801,429 A | * | 9/1998 | Konishi et al. | 257/433 |
| 5,904,354 A | * | 5/1999 | Collins | 277/328 |
| 6,318,729 B1 | | 11/2001 | Pitts, Jr. et al. | |
| 6,637,750 B2 | | 10/2003 | Quoiani | |
| 7,618,045 B2 | * | 11/2009 | Heinfried et al. | 277/321 |
| 2004/0015200 A1 | * | 1/2004 | Lofstedt | 607/37 |
| 2005/0098960 A1 | * | 5/2005 | Heinfried et al. | 277/510 |
| 2007/0065530 A1 | * | 3/2007 | Koehler | 425/67 |
| 2010/0194049 A1 | * | 8/2010 | Kocurek | 277/314 |

* cited by examiner

*Primary Examiner* — David Bagnell
*Assistant Examiner* — Taras P Bemko
(74) *Attorney, Agent, or Firm* — Bracewell & Giuliani LLP

(57) ABSTRACT

A ring like seal assembly for a wellhead assembly that seals between a pair of coaxial tubulars. The seal assembly includes a spring member for exerting an axial force on the seal. The spring member projects from an end of the seal assembly substantially parallel to the axis of the seal assembly and is compressed when installing the seal assembly between the tubulars. Compressing the spring member maintains an axial force on the seal assembly to keep the seal assembly radially deformed so that it can maintain sealing contact with both coaxial tubulars.

9 Claims, 5 Drawing Sheets

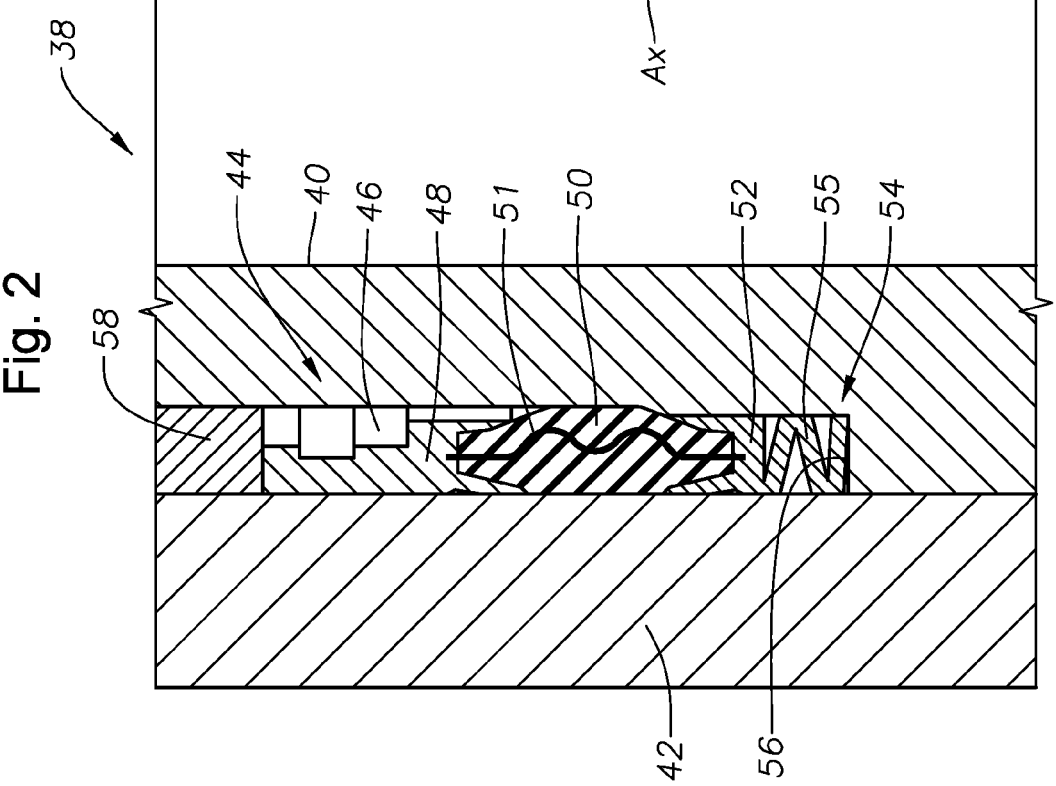
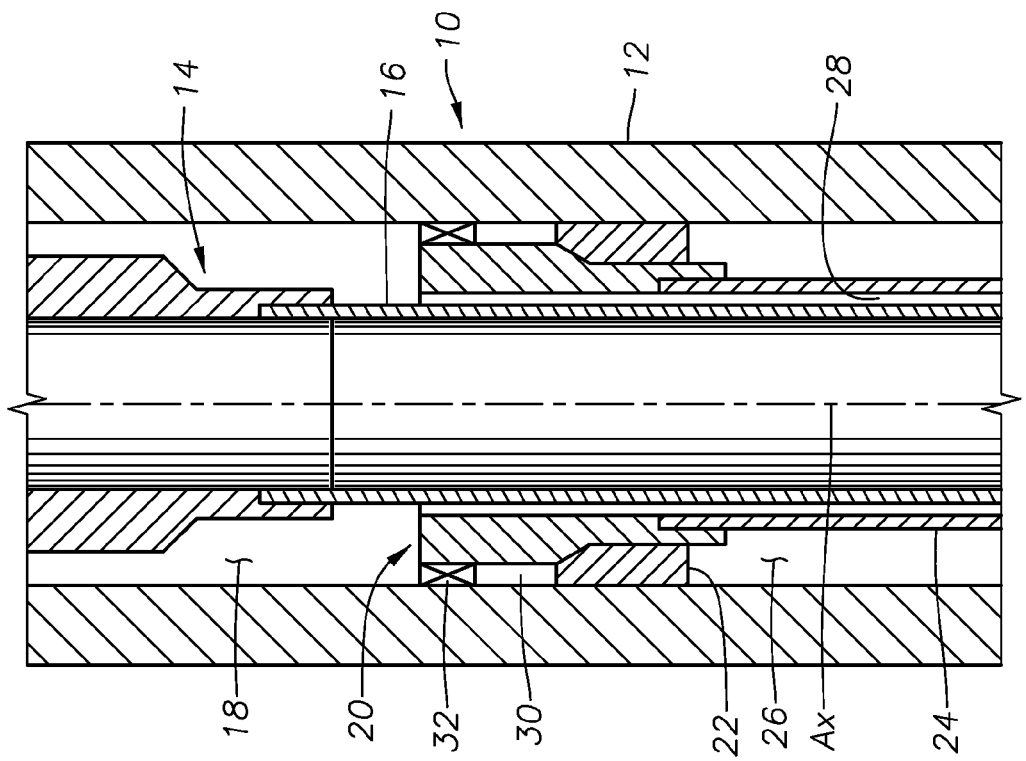

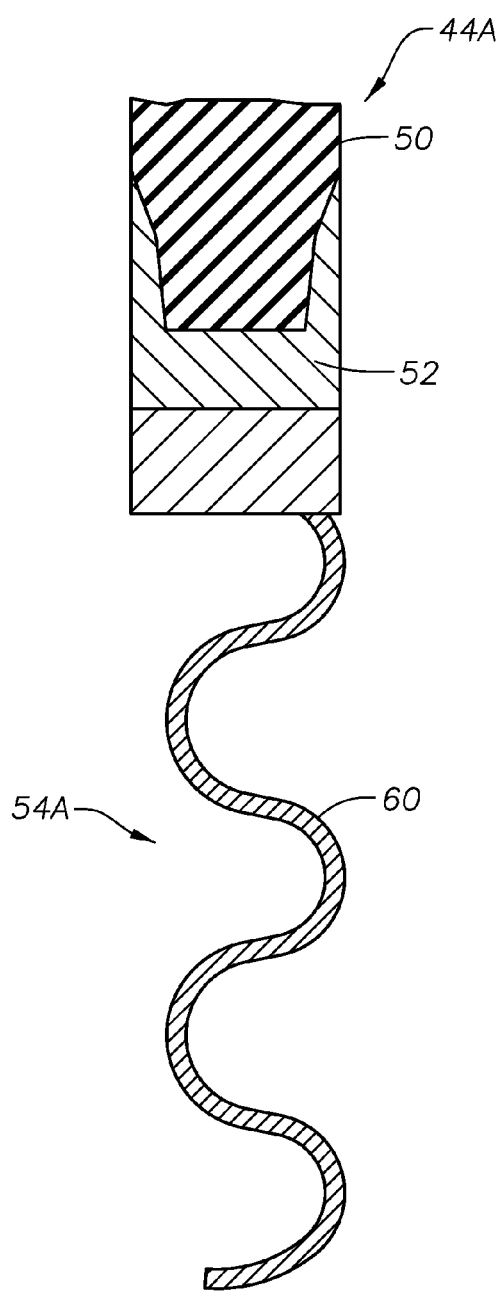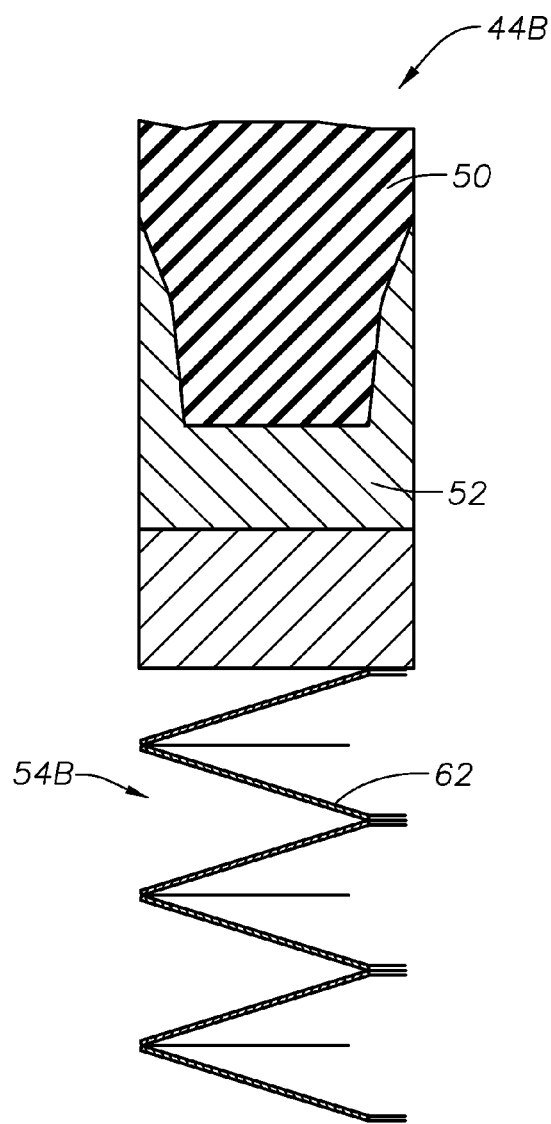

WELLHEAD ANNULUS SEAL ASSEMBLY AND METHOD OF USING SAME

1. FIELD OF THE INVENTION

This invention relates in general to production of oil and gas wells, and in particular to a seal assembly for sealing within an annulus in a wellhead assembly. More specifically, the seal assembly includes a resilient member for retaining the seal assembly in place.

2. DESCRIPTION OF RELATED ART

Wellbores are formed from the earth's surface or seafloor through subterranean formations lying underneath. Systems for producing oil and gas from subsea wellbores typically include a wellhead assembly set over an opening to the wellbore. A typical wellhead assembly, either on land or subsea, includes a high pressure wellhead housing supported in a lower pressure wellhead housing and secured to conductor casing that extends downward past the wellbore opening. Wells are generally lined with one or more casing strings coaxially inserted through, and significantly deeper than, the conductor casing. The casing strings are suspended from casing hangers landed in the wellhead housing. One or more tubing strings are usually provided within the innermost casing string; that among other things are used for conveying well fluid produced from the underlying formations.

Annuluses are formed between the concentric tubulars (casing and tubing) and casing and wellhead housing. Each annulus may have a different pressure and may be used to flow certain fluids therein from time to time. Moreover, in some instances a casing string may develop a leak thereby pressurizing an annulus between the leaking casing string and adjacent tubular. Thus seals are strategically installed in particular locations for pressure isolating sections within the wellhead assembly.

Shown in a side section view in FIG. 1 is one example of a prior art wellhead assembly 10. The wellhead assembly 10 includes a wellhead housing 12 that coaxially circumscribes a tubing hanger 14 shown supporting a string of production tubing 16. The tubing hanger 14 is coaxially set within the wellhead housing 12 to define a tubing hanger annulus 18 in the space between the tubing hanger 14 and wellhead housing 12. A casing hanger 20 is also coaxially landed within the wellhead housing 12 and has an upper end that defines the lower boundary of the tubing hanger annulus 18. The casing hanger 20 is schematically depicted as landed on a shoulder 22 formed on the wellhead housing 12 inner radius and projecting inward towards the wellhead assembly axis $A_X$.

Casing 24, which is supported from the bottom end of the casing hanger 20, depends downward circumscribing the production tubing 16. A casing annulus 26 is foamed between the casing 24 and the wellhead housing 12 and a tubing annulus 28 is formed between the casing 24 and tubing 16. An annular space between the casing hanger 20 and wellhead housing 12 defines a casing hanger annulus 30. The casing hanger annulus 30 includes an annular seal assembly 32 that creates a pressure barrier between the casing annulus 26 and tubing hanger annulus 18. The seal assembly 32 can also prevent communication between the casing annulus 26 and the tubing annulus 28. As noted above, the different annuluses of the wellhead assembly 10 may at times have different pressures, can have different types of fluid flowing therethrough, and can experience unexpected leakage.

Decreased temperatures experienced by the seal 32 can cause it to shrink an amount depending on its coefficient of thermal expansion. A sufficient amount of cooling coupled with a reasonable thermal expansion coefficient can sufficiently contract the seal 32 and reduce the sealing capability of the seal 32.

SUMMARY OF INVENTION

Disclosed herein is a wellhead assembly that includes an outer tubular member, an inner tubular member coaxial within the outer tubular member relative to an axis of the outer tubular member, a seal pocket between the inner and outer tubular members, an annular seal assembly in the seal pocket, and a spring element in the seal pocket and axially compressed against one end of the seal assembly. The seal assembly, in an embodiment, includes an annular elastomeric sealing ring, an annular base ring attached to an end of the sealing ring, an annular upper ring on an end of the sealing ring opposite the base ring, wherein the spring element engages the base ring. The spring element can be made up of accordion shaped folds, a corrugated member, or Belleville washers. Optionally, a pocket can be within one of the inner or outer tubular members that defines a lower end of the seal pocket, and the spring element is compressed between the shoulder and the seal assembly. The wellhead assembly can, also include a lockdown member that engages an upper end of the seal assembly and defines an upper end of the seal pocket. The outer tubular member can be a wellhead housing or a casing hanger; the inner tubular can be a casing hanger or a tubing hanger.

Also disclosed herein is a method of sealing an annulus between an inner and outer tubular member of a wellhead assembly. In one example embodiment the method includes providing a seal assembly with a spring member on an end of the seal assembly, coaxially disposing the seal assembly within the annulus and radially deforming the seal assembly between the inner and outer tubular member, and axially compressing the spring member against the seal assembly.

Yet further disclosed is another example of a wellhead assembly that includes an outer tubular member, an inner tubular member coaxial within the outer tubular member to define an annular seal pocket between the outer and inner tubular members, a shoulder extending outward from the inner tubular outer surface and defining a lower end of the seal pocket, an annular seal assembly within the seal pocket, a spring element in engagement with one of the ends of the seal assembly, and a lockdown member coupled to the inner tubular member, defining an upper end of the seal pocket, the lockdown member being positioned to radially deform the seal assembly and compress the spring element, which in turn exerts an axial force on the seal assembly.

BRIEF DESCRIPTION OF THE DRAWINGS

Some of the features and benefits of the present invention having been stated, others will become apparent as the description proceeds when taken in conjunction with the accompanying drawings, in which:

FIG. 1 is a side sectional view of a prior art wellhead assembly.

FIG. 2 is a sectional view of a portion of a wellhead assembly having a seal assembly.

FIG. 4 is a side sectional view of a portion of an alternate embodiment of a seal assembly.

FIG. 5 is a side sectional view of a portion of an alternate embodiment of a seal assembly.

Figure 3:
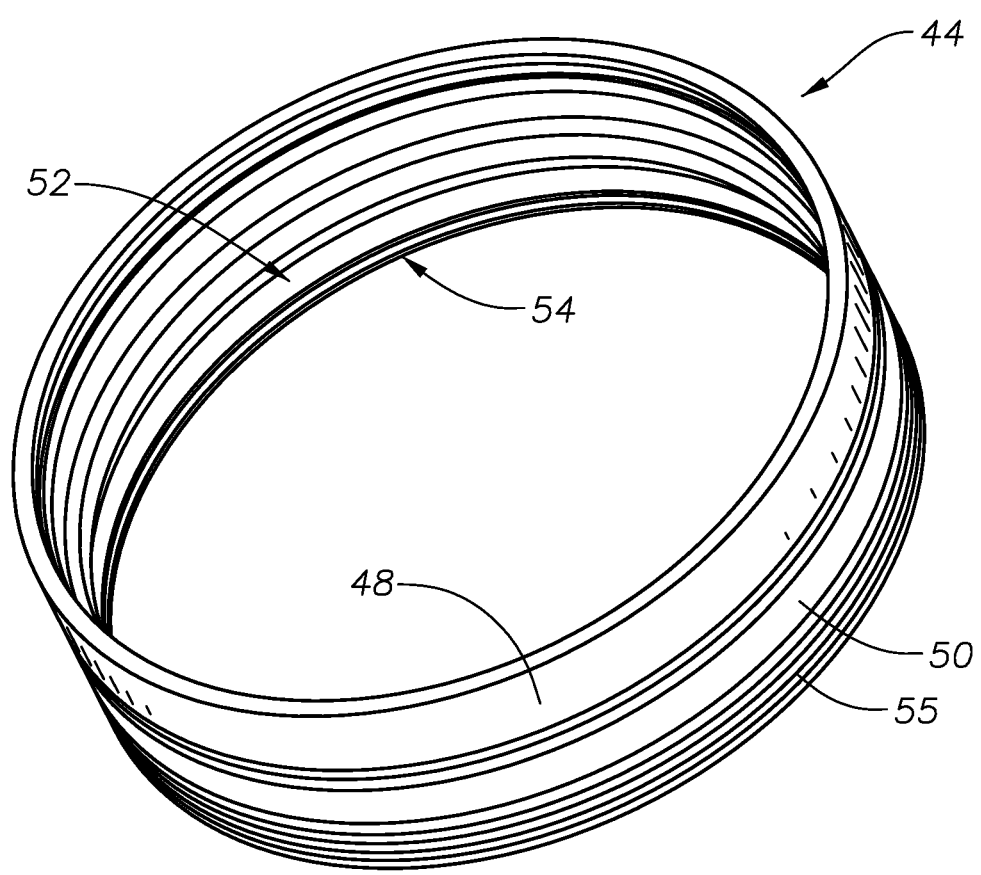
FIG. 3 is a side perspective view of the seal assembly of FIG. 2.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF THE INVENTION

The apparatus and method of the present disclosure will now be described more fully hereinafter with reference to the accompanying drawings in which embodiments are shown. This subject of the present disclosure may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout. For the convenience in referring to the accompanying figures, directional terms are used for reference and illustration only. For example, the directional terms such as "upper", "lower", "above", "below", and the like are being used to illustrate a relational location.

It is to be understood that the subject of the present disclosure is not limited to the exact details of construction, operation, exact materials, or embodiments shown and described, as modifications and equivalents will be apparent to one skilled in the art. In the drawings and specification, there have been disclosed illustrative embodiments of the subject disclosure and, although specific terms are employed, they are used in a generic and descriptive sense only and not for the purpose of limitation. Accordingly, the subject disclosure is therefore to be limited only by the scope of the appended claims.

A portion of a wellhead assembly 38 is illustrated in a side sectional view in FIG. 2 that includes an inner tubular 40 coaxially disposed adjacent an outer tubular 42. The inner tubular 40 can be a production tubing hanger as well as a casing hanger; whereas the outer tubular 42 can be a casing hanger or a wellhead housing. An example of a seal assembly 44 is shown disposed in a seal pocket 46 formed in the space between the inner tubular 40 and outer tubular 42. The seal assembly 44 includes an annular upper ring 48 and has a sealing ring 50 along its mid portion. The sealing ring 50 of FIG. 2 has an elliptically-shaped cross section and an optional connection band 51 shown extending lengthwise therethrough. A base ring 52 shown attached on the lower end of the sealing ring 50 makes up the lower portion of the seal assembly 44.

In one example, the sealing ring 50 is made up of an elastic material that is deformable when disposed in the seal pocket 46 between the inner tubular 40 and outer tubular 42. Example materials include elastomeric polymers, elastomers, polymers, as well as other substances, softer than the material of the inner tubular 40 and outer tubular 42. The upper ring 48 can be formed from a material having strength properties greater than the sealing ring 50 and closer to that of the inner tubular 40 and outer tubular 42. Example metals include steel, stainless steel, carbon steel and similar alloys.

A spring element 54 is shown depending from the base ring 52 opposite to the sealing ring 50. The spring element 54 of FIG. 2 includes a series of folds 55 that form an accordion or bellows arrangement capable of storing potential energy therein when compressed. In one example, the base ring 52 and spring element 54 are formed from materials the same as or similar to the materials of the upper ring 48. As shown in several figures, the spring element 54 and the base ring 52 can be an integrally formed single-piece member. Forming the spring element 54 from materials having a high strength that are also elastic forms a spring-like element that when compressed will exert a force substantially parallel to the wellhead assembly axis $A_X$.

A shoulder 56 is shown provided with the inner tubular 40 that projects radially outward from the tubular 40 and defines the lower end of the seal pocket 46. As shown, the spring element 54 is shown resting on the shoulder 56 and a lockdown member 58 is pressed downward against the upper ring 48. The lockdown member 58 applies a compressive force on the seal assembly 44 to retain the spring element 54 in a compressed configuration. Since the spring element 54 is a resilient member, compressing the seal assembly 44 between the lockdown member 58 and shoulder 56 stores an axially directed retention force within the seal assembly 44. The spring element 54 exerts the retention force upward against the seal assembly 44. The compressive force from the lockdown member 58 and/or the spring element 54 radially deforms the sealing ring 50 so it is in contact with both the inner and outer tubulars 40, 42.

A perspective view of an example of seal assembly 44 is provided in FIG. 3. As shown in FIGS. 2 and 3, the seal assembly 44 outer circumference is substantially planar along the respective outer surfaces of the upper ring 48, seal ring 50 and a portion of the base ring 52. However, the inner surface of the seal assembly 44 includes a series of transitions along the upper ring 48 to change its inner radius. Additionally, the inner radius of the seal ring assembly 44 is reduced adjacent the seal ring as the mid portion of the seal ring 50 juts inward towards the axis $A_X$. It should be pointed out, however, that other seal ring embodiments can be included with the present disclosure, wherein the sealing or elastomeric portion of the seal assembly projects both radially inwardly and outwardly, and components of the seal ring assembly 44, other than the seal ring, can have substantially planar surfaces on their inner and outer radius, or include inner and outer radial surfaces having transitions on both sides.

An alternate example of a seal ring assembly 44A is shown in a side sectional view in FIG. 4. In this example, the retention member 54A is made up of a series of curved members 60 that form a sinusoidal shape in cross section. Similar to the flat folds 55 (FIG. 2), compressing the curved members 60, stores energy when in the compressed state that then exerts a corresponding axial force in both directions away from the spring element 54A. Another example of a seal assembly 44B is shown in a side sectional view in FIG. 5. In this example, the spring element 54B includes a series of stacked Belleville washers 62, that similar to the curved members 60 and flat members 55, are elastic and resilient so that potential energy is stored therein when compressed that then in turn exerts a retaining force throughout the seal assembly 44B.

In one example of use of the seal assembly described herein, the seal assembly 44, 44A, 44B is disposed within a seal pocket 46 between an inner and outer tubular 40, 42. While remaining fixed in place, a lockdown member 58 (FIG. 2) pushes on an end of the seal assembly 44, 44A, 44B to compress the spring element 54, 54A, 54B and store potential energy therein. One example of a lockdown member can be found in U.S. Pat. No. 4,949,787, which is assigned to the assignee of the current application. It should be pointed out that alternative embodiments of the seal assembly 44 exist where the retention member 54 can be on the upper end and on the side of the seal assembly 44 opposite the shoulder 56. Additionally, other embodiments exist wherein the shoulder on which the seal assembly 44 rests is on an outer tubular 42. In one embodiment, the lockdown member 58 is coupled with the tubular on which the shoulder 56 is formed.

Figure 6:
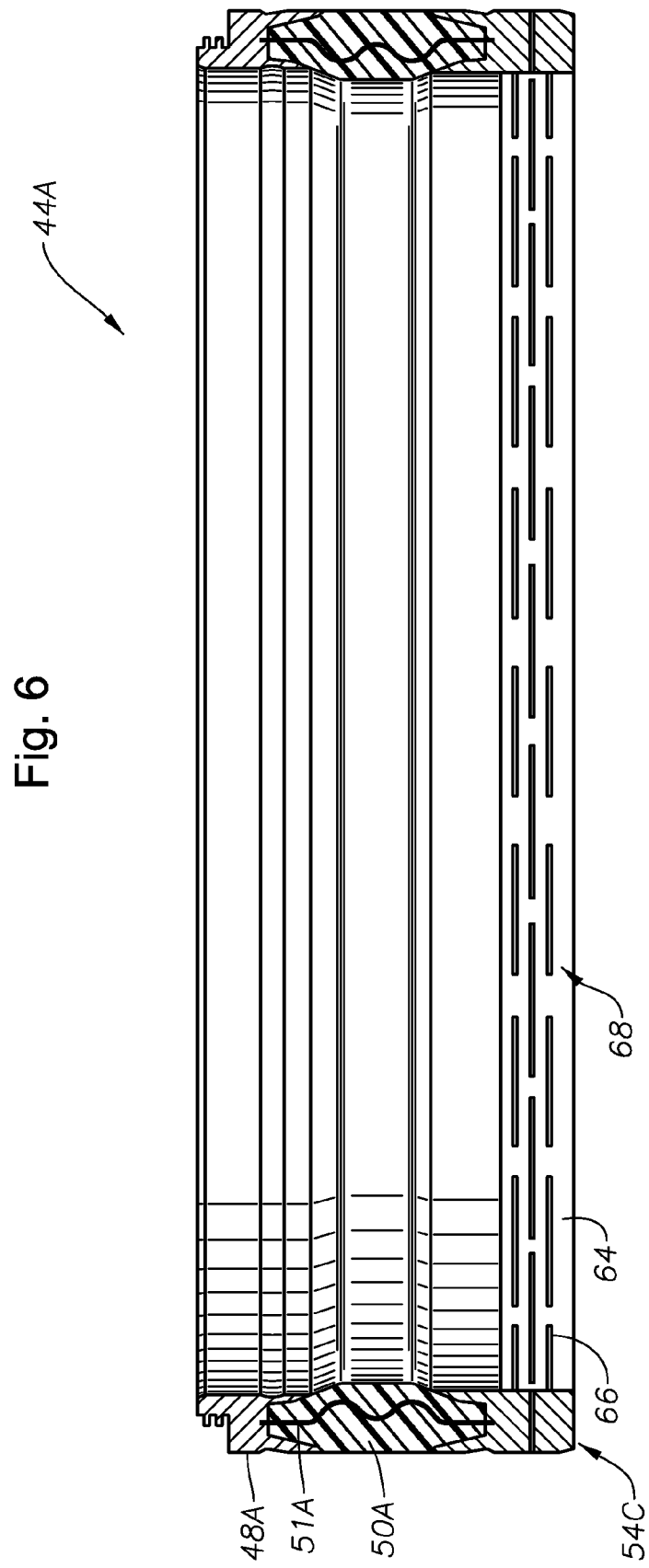
FIG. 6 is a side partial sectional view of an alternate embodiment of a seal assembly.

Shown in a side partial sectional view in FIG. 6 is another example of a seal assembly 44A. The seal assembly 44A illustrated includes a base portion 64 that is shown depending from the lower portion of the sealing ring 50A. Slots 66 are provided in the base portion 66 along its entire circumference. The slots 66 are arranged in rows 68, where each row 68 is at a different height within the base portion 64. In one example, the slots 66 within adjacent rows 68 are staggered from one another. Also provided in the example of FIG. 6 is an upper ring 48A on an end of the sealing ring 50A opposite the base portion 64. The upper ring 48A profiles inward at a transition shown disposed a distance upward from the sealing ring 50A forming a reduced thickness portion above the transition. Ridges protrude radially outward from the upper ring 48A from its reduced thickness portion.

Figure 7A:
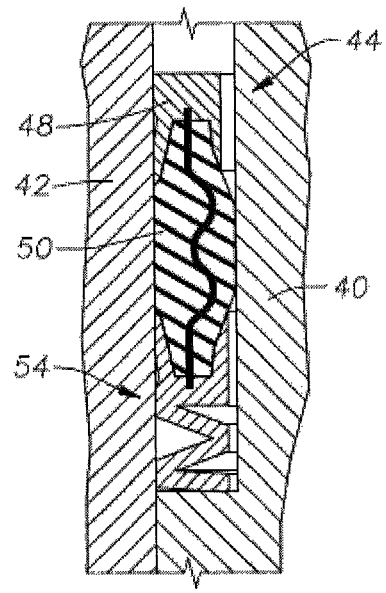
FIG. 7A is a schematic depiction of a seal assembly in an undeformed state.
Figure 7B:
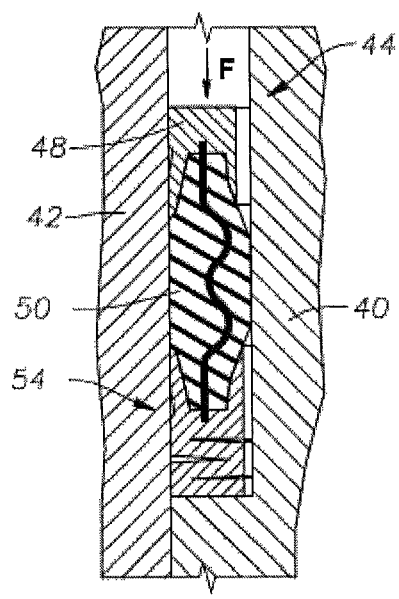
FIG. 7B is a schematic depiction of the seal assembly of FIG. 7A in a deformed state.

FIG. 7A schematically depicts an example of a seal assembly 44 disposed in the space between an inner tubular 40 and an outer tubular 42. In this embodiment, a lockdown ring 58 (FIG. 2) has not engaged the upper ring 48 of the seal assembly 44. Thus without an axial force applied to the seal ring 50, the spring 54 and the seal ring 50 are both in a generally undeformed state. In an undeformed state, gaps may exist between the inner and outer walls of the seal ring 50 and the inner and outer tubulars 40, 42. Referring now to FIG. 7B, the lockdown ring 58 has engaged the seal assembly 44 applying an axial force F that forms an axially compressed and radially deformed seal ring 50. The radial deformation of the seal ring 50 bulges its inner and outer walls outward into sealing contact with the inner and outer tubulars 40, 42. The axial force F also forms a compressed and deformed spring 54, in which potential energy is stored. Thus over time with variations in temperature that can contract the tubulars 40, 42 and reduce the magnitude of the force F, the axially deformed spring 54 can expand to maintain radial deformation of the seal ring 50 and sealing between the tubulars 40, 42.

The present system and method described herein, therefore, is well adapted to carry out and attain the ends and advantages mentioned, as well as others inherent therein. While a presently preferred embodiment has been given for purposes of disclosure, numerous changes exist in the details of procedures for accomplishing the desired results. These and other similar modifications will readily suggest themselves to those skilled in the art, and are intended to be encompassed within the spirit of the present invention disclosed herein and the scope of the appended claims.

What is claimed is:

1. A wellhead assembly comprising:
    a wellhead housing;
    a tubular inner wellhead member coaxial within the wellhead housing relative to an axis of the wellhead housing and stationarily landed within the wellhead housing;
    an external upward facing shoulder on the inner wellhead member, defining is seal pocket between the inner wellhead member and the wellhead housing, the shoulder being in a plane perpendicular to the axis, an outer surface of the inner wellhead member within the seal pocket being cylindrical, and inner surface of the outer wellhead member within the seal pocket being cylindrical;
    an annular seal assembly in the seal pocket and comprising, an annular elastomeric sealing ring, an annular metallic upper ring on an upper end of the sealing ring, an annular metallic base ring attached to a lower end of the sealing ring, the base ring having a lower portion that abuts the upward facing shoulder and is integrally formed with the base ring and configured into a resilient member;
    a lockdown member in engagement with the inner wellhead member and the wellhead housing and having a lower end in abutment with the upper ring to deform the sealing ring into static sealing engagement with the inner wellhead member and the wellhead housing when an axial force is applied to the lockdown member, and wherein the axial force on the lockdown member exerts a compressive force to axially deform the lower portion of the base ring; and
    wherein the axially deformed lower portion of the base ring exerts an upward force on the sealing ring to maintain the static sealing engagement in the event that cooling causes the sealing ring to shrink.

2. The wellhead assembly of claim 1, wherein elongated, circumferentially extending slots are formed radially through the lower portion of the base ring at spaced apart locations along a circumference of the base ring to define the resilient member in the base ring.

3. The wellhead assembly of claim 1, wherein the lower portion of the base ring comprises a series of accordion shaped folds.

4. The wellhead assembly of claim 1, wherein the base ring has an upper inner leg located radially inward from a lower portion of the sealing ring that is in metal-to-metal contact with the wellhead housing and an upper outer leg located radially outward from a lower portion of the sealing ring that is in metal-to-metal contact with the inner wellhead member.

5. A method of sealing an annulus between a tubular inner wellhead member and a wellhead housing of a wellhead assembly, the inner tubular member being stationarily landed within the wellhead housing, the method comprising:
    providing an upward facing shoulder on an exterior of the inner wellhead member to define a lower end of the annulus, the upward facing shoulder being in a plane perpendicular to an axis of the wellhead housing, an outer surface of the inner wellhead member extending upward from the upward facing shoulder being cylindrical, and an inner surface of the outer wellhead member adjacent said outer surface being cylindrical;
    providing an annular seal assembly that comprises an annular sealing ring, a metallic upper ring mourned to an upper end of the sealing ring, and a metallic resilient base member attached to a lower end of the sealing ring, the base member having a spring element integrally formed with the base member;
    coaxially disposing the seal assembly within the annulus and abutting the base member on the upward facing shoulder;
    exerting a downward axial force with a lockdown member on the upper ring, thereby axially compressing the seal assembly so that the sealing ring is radially enlarged into static sealing engagement against the inner wellhead member and the wellhead housing and the spring element of the base member is axially deformed to store potential energy in the base member; and
    with the spring element of the axially deformed base member, maintaining an axial force against the sealing ring to retain static sealing engagement with the inner wellhead member and the wellhead housing in the event cooling of the sealing ring causes shrinkage of the sealing ring.

6. The method of claim 5, wherein the spring element of the base member comprises accordion shaped folds.

7. The method of claim 5, wherein the sealing ring is elastomeric.

8. A wellhead assembly comprising:

a wellhead housing having a bore;

a tubular inner wellhead member stationarily landed in the bore and having an external upward facing shoulder that is in a plane perpendicular to an axis of the bore;

a seal assembly sealing between an inner surface of the wellhead housing and an outer surface of the inner wellhead member, the inner and outer surfaces being cylindrical and concentric, the seal assembly landing on the upward facing shoulder and comprising:

a single annular elastomeric sealing ring having inner and outer sides, the outer side statically sealing against the inner surface of the wellhead housing, the inner side statically sealing against the outer surface of the inner wellhead member;

an annular metallic upper ring attached to an upper end of the sealing ring;

an annular metallic base ring attached to lower end of the sealing ring;

a spring element extending downward from the base ring into contact with the upward facing shoulder, the spring element comprising a series of accordion-shaped folds, the spring element and the base ring being an integrally formed single-piece member;

a lockdown member in abutment with the seal assembly and in engagement with the wellhead housing and the inner wellhead member to apply an axial force to the upper ring of the seal assembly, causing the sides of the elastomeric sealing ring to deform away from one another into static sealing engagement with the wellhead housing and the inner wellhead member, and causing the spring element to compress against the upward facing shoulder to retain stored energy therein; and wherein the stored energy causes the spring element to exert an upward three on the sealing ring to maintain the static sealing engagement in the event the sealing ring shrinks due to cooling.

9. The seal assembly of claim 8, wherein the base ring has an upper inner leg located radially inward from a lower portion of the sealing ring that is in metal-to-metal contact with the wellhead housing and an upper outer leg located radially outward from a lower portion of the sealing ring that is in metal-to-metal contact with the inner wellhead member.

* * * * *